Figure 1:
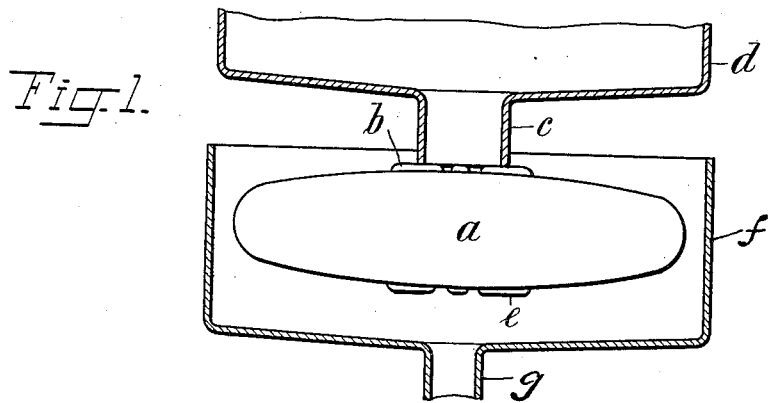

C. G. RUNNQUIST.
LIQUID SUPPLY REGULATING DEVICE FOR CREAM SEPARATORS.
APPLICATION FILED SEPT. 4, 1913.

1,101,964.

Patented June 30, 1914.
2 SHEETS—SHEET 1.

WITNESSES:
Rob R Ritchel
E. E. Hall

INVENTOR
Claes Gösta Runnquist
BY
Frank L. Busser
ATTORNEY.

C. G. RUNNQUIST.
LIQUID SUPPLY REGULATING DEVICE FOR CREAM SEPARATORS.
APPLICATION FILED SEPT. 4, 1913.

1,101,964.

Patented June 30, 1914.
2 SHEETS—SHEET 2.

WITNESSES:

INVENTOR
Claes Gösta Runnquist
BY
Frank S. Busser
ATTORNEY.

UNITED STATES PATENT OFFICE.

CLAES GÖSTA RUNNQUIST, OF STOCKHOLM, SWEDEN, ASSIGNOR TO AKTIEBOLAGET SEPARATOR, OF STOCKHOLM, SWEDEN.

LIQUID-SUPPLY-REGULATING DEVICE FOR CREAM-SEPARATORS.

1,101,964.   Specification of Letters Patent.   Patented June 30, 1914.

Application filed September 4, 1913. Serial No. 788,071.

*To all whom it may concern:*

Be it known that I, CLAES GÖSTA RUNNQUIST, a subject of the King of Sweden, residing at Stockholm, Sweden, have invented a new and useful Improvement in Liquid-Supply-Regulating Devices for Cream-Separators, &c., of which the following is a full, clear, and exact description, reference being had to the accompanying drawings, which form a part of this specification.

In cream separators and other machines, to which a practically uniform liquid flow is to be conducted from a receiver situated at a higher level, independent of the head in the receiver, it is usual to interpose a regulating cup in the line of flow. The level of the liquid in the regulating cup is kept approximately constant by a float, and the outlet to the machine is through a pipe of determined diameter, thus insuring a practically constant flow of liquid to the machine. In this device the float more or less shuts off the supply from the receiver, and thereby regulates the outflow from the same in such a way that the supply to the regulating cup always corresponds to the approximately uniform outflow from the same. If, during the working, the liquid level in the receiver sinks, a tendency to diminution of the supply to the regulating cup will occur, the level in said cup will sink, and therefore the float therein will be lowered. This lowering of the float, however, correspondingly opens the supply from the receiver, thereby raising again the level of liquid in the regulating cup, until equilibrium is again established. When the level in the liquid receiver is raised the operation is reversed. It is clear that a perfectly regulated flow to the machine cannot be actually obtained by this means, as the varying head of liquid in the receiver produces corresponding variations in the height of the float in order to effectuate the variations of the outflow area to the regulating cup, and as furthermore the displacement of the float may vary in proportion to the loading caused by the varying liquid pressure. In order to reduce these inconveniences and to make the continuous flow as independent as possible of the head of liquid in the receiver, it has been found advantageous to make the float as large as possible in area, and also to make the supply conduit from the receiver to the regulating cup as large as possible. However, this, too, produces bad results, as the float is apt to attain a regular vertical pulsating movement, the amplitude of which increases up to a certain limit, and which causes foaming and splashing and a certain degree of pulsation in the working process. This may be explained as follows: When the float for any reason sinks a little below its level of equilibrium, the pressure above it is decreased whereas the lifting pressure of the liquid is increased. The float is thus moved upward by a certain force and attains velocity upwardly, which reaches its maximum approximately at the level of equilibrium. On account of the inertia of the float, however, this upward movement is continued above the level of equilibrium, thereby closing to a greater degree the liquid supply from the receiver. Thus, on account of the force exerted by the streaming flow of liquid, the pressure on the upper surface of the float is rapidly increased, the buoyant action of the liquid below is at the same time decreased, and the upward movement of the float is soon stopped. The velocity upward is therefore reduced to zero and the float begins to again move downwardly. Under certain circumstances, these vertical pulsations or oscillations of the float have a tendency, as mentioned above, to grow greater and greater, depending mainly on the relatively great increase in the pressure which occurs if the float, in its upward movement, if only for a moment, entirely closes the outlet from the receiver.

My invention relates to improvements in the regulating device by which these pulsations are avoided or at least reduced to a minimum. In order to more clearly explain my invention, I will now describe it in detail in connection with the accompanying drawings, in which—

Figure 2:
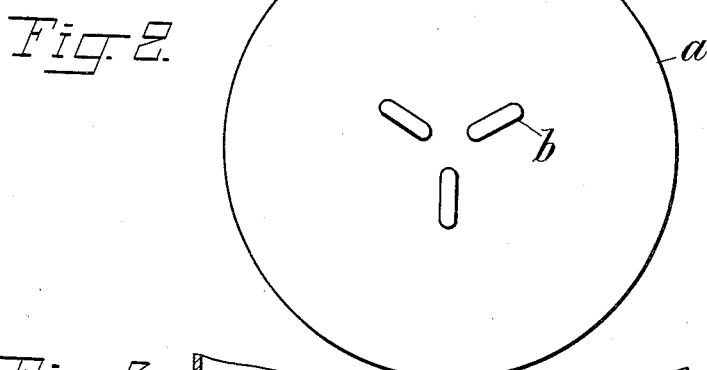
Figure 3:
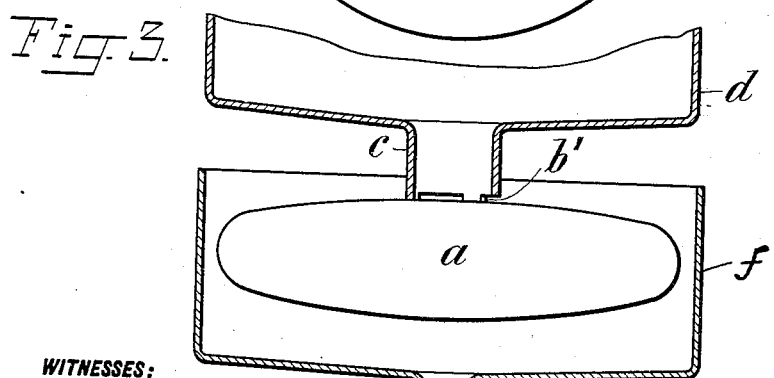
Figure 4:
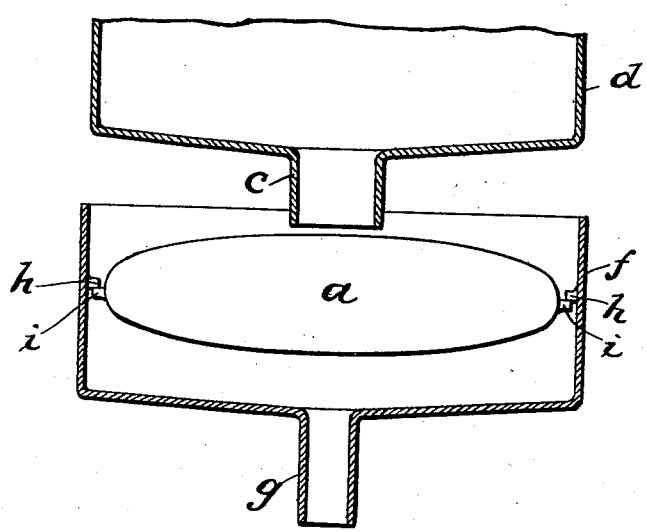

Figure 1 shows in sectional elevation an apparatus containing one embodiment of my invention. Fig. 2 is a plan view of the same. Figs. 3 and 4 are views, similar to Fig. 1, illustrating other forms of my invention.

In the drawings, $a$ is the float in the regulating cup $f$.

$c$ is the inlet pipe from the liquid receiver $d$ to the regulating cup and may be assumed to be a part of the cup, although shown as physically attached to the receiver $d$.

$g$ is the outlet from the regulating cup to the cream separator.

In the form of my invention shown in Figs. 1 and 2, I provide projections, ribs or lugs $b$ on the upper surface of the float, which limit the upward movement of the float by contacting with the outlet $c$ of the receiver. The size of these lugs $b$ is such that the free outlet area between them, when in contact with the outlet $c$ as shown in Fig. 1, is a trifle smaller than what is necessary, at the highest level in the liquid receiver, to give the required velocity of flow. By this means, the float, in its upward movement, can never wholly close the outlet from the receiver, but always leaves at least a certain fixed area of outflow. The retardation of the flowing liquid caused by the upward movement of the float, and the increase of pressure upon the float resulting therefrom, are thus reduced to a minimum. The principal force causing the vertical pulsations of the float being thus greatly reduced, it is seldom more than sufficient to overcome friction and the other resistance against movement, so that this regulation of the float makes its movement practically non-periodical. The float may be provided with lugs $e$ in its lower surface similar to lugs $b$, in order to make it indifferent which side of the float is turned upward, thus removing the likelihood of improper placement of the float in position.

In the form of my invention shown in Fig. 3, instead of providing lugs upon the float itself, I form the lower edge of the outer pipe $c$ with projections $b'$, whose function is the same as that of the lugs, above described.

Other equivalent arrangements to take the place of lugs $b$ and limit the closing of the outlet pipe by the float to a certain predetermined amount, may be devised, as, for instance, shoulders $h$, Fig. 4, projecting inwardly from the walls of the regulating cup against which projections $i$ on the float $a$ strike in its upward movement. I do not desire the scope of my invention to be limited, therefore, to the precise embodiments of my invention herein set forth.

Having now fully described my invention, what I claim and desire to protect by Letters Patent is:

1. Means for regulating the liquid supply from a liquid receiver to centrifugal cream separator machines, etc., comprising a regulating cup, an inlet pipe at the upper part thereof, an outlet pipe at the bottom thereof, a float in the cup between the two pipes, and projections on one of said members adapted to limit the upward movement of the float and thereby afford a minimum supply to the cup when the float is in its extreme upper position.

2. Means for regulating the liquid supply from a liquid receiver to centrifugal cream separator machines, etc., comprising a regulating device consisting of a cup and a float therein, said cup having an inlet from the receiver and an outlet to the machine, said float adapted in its upward movement to decrease, and in its downward movement to increase, the affluxion area for the liquid flowing to the cup and thereby tend to maintain approximately constant the liquid level therein, and means arranged to limit the vertical movement of the float and afford, in its highest position, a minimum space between its upper surface and the inlet to allow the milk to continue to flow to the cup from the inlet over the float and thus prevent or reduce vertical pulsations of the float.

3. Means for regulating the liquid supply from a liquid receiver to centrifugal cream separating machines, etc., comprising a regulating cup having an inlet from the receiver and an outlet to the machine, a float in the cup adapted in its upward movement to decrease, and in its downward movement to increase, the affluxion area for the liquid flowing to the cup and thereby tend to maintain approximately constant the liquid level therein, and projections on the upper face of the float adapted to limit the upward movement of the float and thus limit the extent to which the supply is shut off.

4. Means for regulating the liquid supply from a liquid receiver to centrifugal cream separating machines, etc., comprising a regulating cup having an inlet from the receiver and an outlet to the machine, a float in the cup adapted in its upward movement to decrease, and in its downward movement to increase, the affluxion area for the liquid flowing to the cup and thereby tend to maintain approximately constant the liquid level therein, and projections on both faces of the float adapted, in whichever position the float is inserted in the cup, to limit the extent to which the supply is shut off.

5. Means for regulating the liquid supply from a liquid receiver to centrifugal cream separating machines, etc., comprising a regulating cup, an inlet pipe at the upper part thereof, an outlet pipe at the bottom thereof, a reversible float in the cup between the two pipes, and projections which limit the upward movement of the float in whichever position the float is inserted in the cup, and thereby afford a minimum supply to the cup when the float is in its extreme upper position.

In testimony of which invention, I have hereunto set my hand, at Stockholm, on this 12th day of August, 1913.

CLAES GÖSTA RUNNQUIST.

Witnesses:
TH. WAWRINSKY,
HARRY ALBIHN.